Aug. 9, 1927.
J. BUNIS
1,638,615
BUMPER AND FENDER
Filed Feb. 16, 1927
2 Sheets-Sheet 1
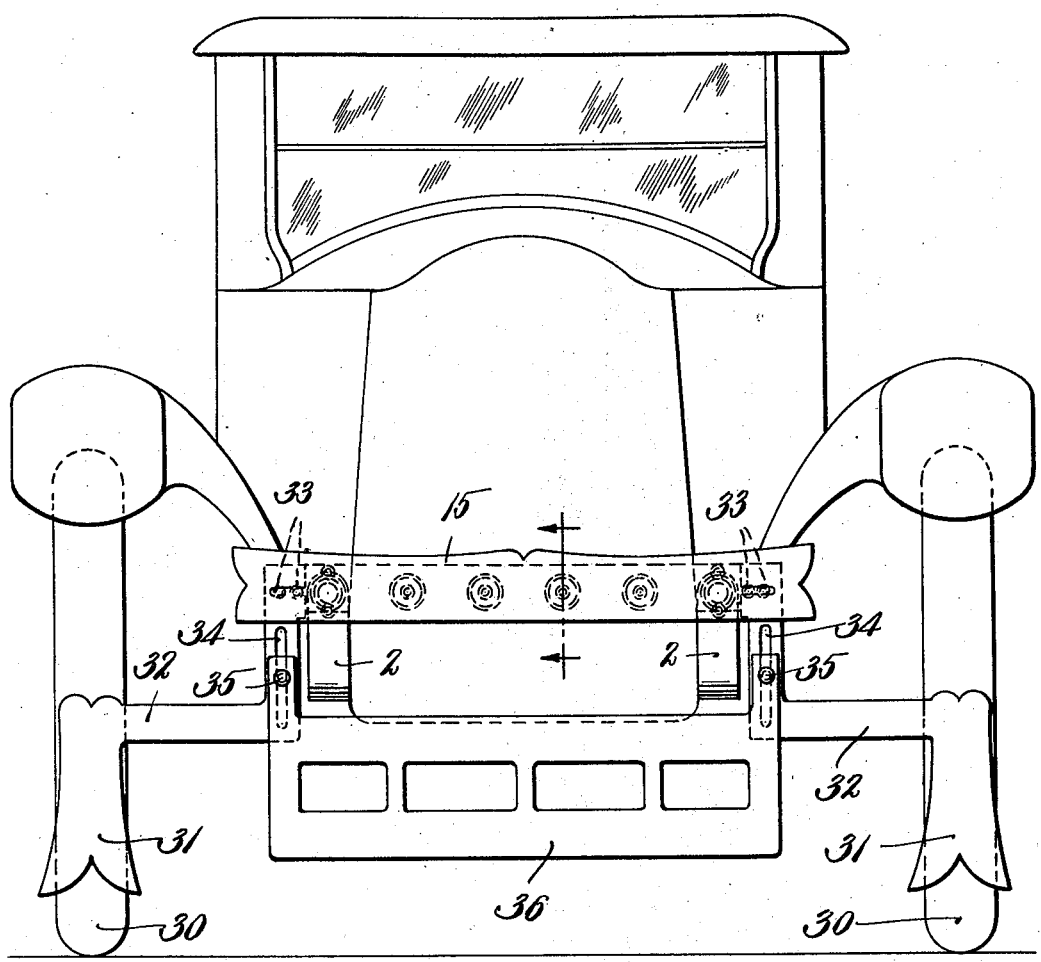
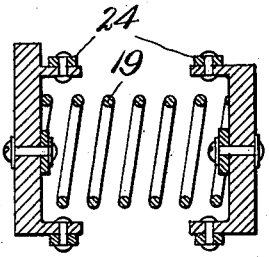
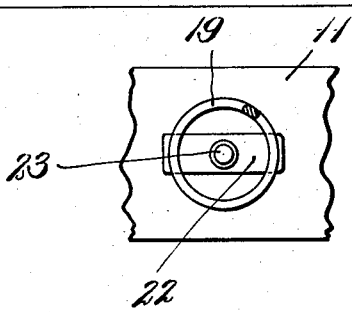
Inventor
Julius Bunis Aug. 9, 1927.
J. BUNIS
1,638,615
BUMPER AND FENDER
Filed Feb. 16, 1927
2 Sheets-Sheet 2
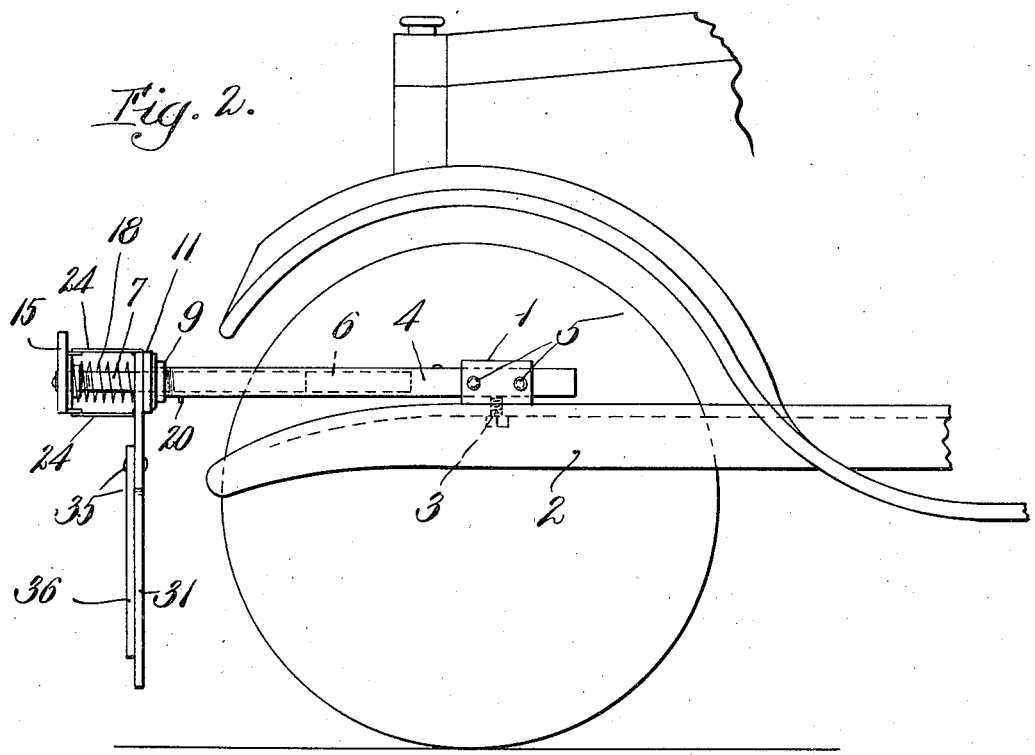
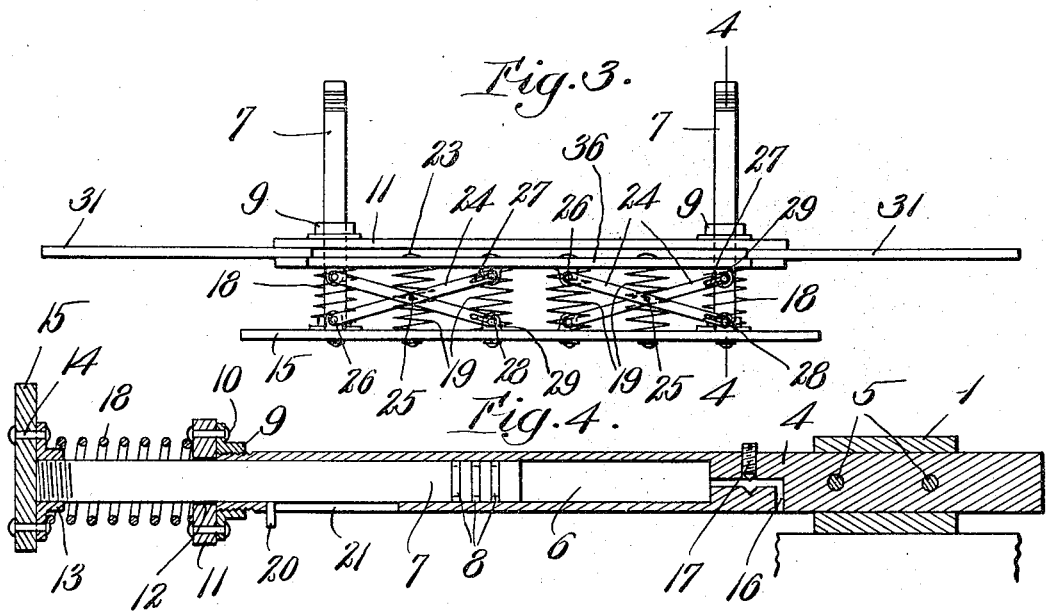
Inventor
Julius Bunis
by Arthur E. Randall
att'y Patented Aug. 9, 1927.

1,638,615

UNITED STATES PATENT OFFICE.

JULIUS BUNIS, OF MALDEN, MASSACHUSETTS.

BUMPER AND FENDER.

Application filed February 16, 1927. Serial No. 168,584.

My invention relates to fenders and bumpers for automobiles and it has for its object to provide an improved structure of this class.

To these ends I have provided an improved bumper and fender having the peculiar features of construction and mode of operation set forth in the following description, the novel features thereof being particularly pointed out and defined in the claims at the close of the description.

In the accompanying drawings:

Figure 1 is a front elevation of an automobile equipped with a combined fender and bumper constructed in accordance with my invention.

Figure 2 is a side elevation of parts shown in Fig. 1.

Figure 3 is a plan view of the middle section of my improved bumper and fender.

Figure 4 is a section on line 4—4 of Fig. 3.

Figures 5 and 6 are enlarged fragmentary details hereinafter described.

The embodiment of my invention, herein illustrated, comprises a pair of socket brackets 1, 1 secured to the side bars 2, 2 of the chassis by means of screws 3, each socket bracket 1 resting on the top of the side bar and being clamped rigidly in position thereon by means of the screws 3 which extend through holes in the upper flange of the side bar and enter tapped holes in the bracket 1. Each bracket 1 is formed with a horizontal cylindrical hole within which is arranged the rear end portion of a side bar member 4 fastened rigidly to its bracket 1 by means of pins 5 extending through the bracket and side bar section. The forward end portion of each side bar section 4 is made tubular to provide a piston chamber 6 within which is slidably mounted a piston side bar section 7 provided with packing rings 8 at its rear end. Each tubular side bar section 4 is exteriorly threaded and screwed into a flange member 9 fastened by rivets 10 to the rear side of a transverse abutment bar 11. Near its opposite ends the transverse abutment bar 11 is made with holes 12 through which extend the piston side bar sections 7. At their forward ends the piston side bar sections 7 are threaded and screwed into flange members 13 secured by rivets 14 in position against the rear side of a transverse bumper bar 15. At the rear end of its chamber 6 each side bar section 4 is made with a port 16 leading to the exterior thereof whose capacity is regulated and controlled by means of an adjustable valve screw 17. It will thus be clear that in the event of the bumper bar 15 striking an object and being forced rearwardly the air within the chamber 6 will act as a cushion to relieve the blow and prevent shocks from being transmitted to the car on which the bumper is mounted. The degree of cushioning the effect can, of course, be regulated by means of the screw 17.

Normally the bumper bar 15 is held at the limit of its movement in a forward direction by two end springs 18, 18 and two pairs of intermediate springs 19, 19. As a means for limiting the forward movement of the bumper bar 15 under the influence of the coil springs I provide each side bar piston section 7 with a stop pin 20 engaging the forward end of a longitudinal slot 21 provided in the side bar section 4. The two end springs 18 surround the forward portions of the side bar piston section 7 and abut at their ends against the flange members 13 and abutment bar 11, respectively. The intermediate springs 19 have their ends fastened to the bumper bar 15 and abutment bar 11, respectively, by means of clips 22 and bolts 23.

Between the two bars 15 and 11, and disposed horizontally above the coil springs 18 and 19 are two pair of lazy tongs, each comprising two levers 24 pivotally connected together at their middles by a rivet pintle 25. The ends of levers 24 of each lazy tongs at the left (Figure 3) are pivotally connected at 26 to brackets projecting from the two bars 11 and 15 while the opposite ends of said levers are formed with longitudinal slots 27 occupied by studs 28 carried by brackets 29 secured to the two bars 11 and 15. Thus if one end portion of the bumper bar 15 strikes an object and is forced rearwardly, the force of the blow is transmitted through the lazy tongs to the opposite end of the bar 15 so that the latter tends to move squarely back and forth and cramping of the parts is avoided.

These lazy tongs also serve, more or less, as closures for the compartment-like space within which the coil springs 18 and 19 are arranged.

In front of each wheel 30 is a side fender member 31 consisting of an angular arm of stiff metal made with a laterally and inwardly projecting extension 32 having its inner end fastened by bolts 33 to the front side of the adjacent end of the abutment bar 11. Near its inner end each side fender member 31 is formed with a vertical slot 34 to receive a bolt 35 by means of which the adjacent end or side of an intermediate depending fender member 36 is secured to the fender arm 31 with provision for adjustment vertically. The side fender arms 31 serve to prevent the wheels 30 from passing over the body of a person struck by the car while the middle fender member 36 serves to prevent the body of a person from entering beneath the car.

From the above description it will be seen that my improved bumper and fender is of simple and inexpensive construction. It will also be apparent that the body of air within the chamber 6 of side bar sections 4 of the structure serves as resilient or elastic cushions for the bumper 15, the springs 18 and 19 also assisting in providing elastic or yielding cushion means for this bar and in addition serving as the means for holding the bar 15 projected forwardly with the stop pin 20 against the end of its slot 21.

What I claim is:

1. A bumper for automobiles comprising a pair of side bar sections adapted to be fixed to the chassis of the vehicle and each made tubular at its forward end; an abutment bar rigidly connected with the forward ends of said side bar sections; side bar piston sections fitting telescopically into said fixed side bar sections; a transverse bumper bar fixed to the forward ends of said side bar piston sections; metal springs between said abutment bar and said bumper bar for yieldingly holding the latter projected forwardly and a stop for limiting the forward movement of the bumper bar and its side bar piston sections under the influence of said springs.

2. A bumper for automobiles constructed in accordance with claim 1 wherein each fixed side bar section is made with an air port of relatively small capacity communicating at one end with the piston chamber of the side bar section and at its opposite end with the outside atmosphere.

3. A bumper for automobiles constructed in accordance with claim 1 and wherein each fixed side bar section is made with an air port of relatively small capacity communicating at one end with the piston chamber of said fixed side bar section and at its opposite end with the outside atmosphere and an adjustable constriction for said port.

4. A bumper for automobiles constructed in accordance with claim 1 wherein the tubular portion of each fixed side bar section is made with a longitudinal slot and including a stop pin on each side bar piston section occupying said slot.

5. A bumper for automobiles constructed in accordance with claim 1 and including two fender members each disposed in front of one of the wheels of the vehicle and connected with the adjacent end portion of the abutment bar.

6. A bumper for automobiles comprising a pair of side bar sections adapted to be fixed to the chassis of the vehicle and each made tubular at its forward end; an abutment bar rigidly connected with the forward ends of said side bar sections; side bar piston sections fitting telescopically into said fixed side bar sections; a transverse bumper bar fixed to the forward ends of said side bar piston sections; metal springs between said abutment bar and said bumper bar for yieldingly holding the latter projected forwardly; a pair of side fenders each occupying a position in front of one of the wheels of the vehicle and connected with the adjacent end of said abutment bar, and an intermediate fender member connected with said side fender members.

7. A bumper for automobiles constructed in accordance with claim 6 and including means connecting said intermediate fender member to said side fender members with provision for adjustment vertically.

8. A bumper for automobiles comprising a pair of side bar sections adapted to be fixed to the chassis of the vehicle and each made tubular at its forward end; an abutment bar rigidly connected with the forward ends of said side bar sections; movable side bar sections fitting telescopically into said fixed side bar sections; a transverse bumper bar fixed to the forward ends of said movable side bar sections; springs between said abutment bar and said bumper bar for yieldingly holding the latter projected forwardly, and a plurality of pairs of lazy tongs, each pair comprising two lever members pivotally connected together intermediate their ends and each having one end thereof pivotally connected with the bumper bar and its opposite end pivotally connected with the abutment bar, and said lazy tongs occupying positions above said springs.

Signed by me at Boston, county of Suffolk and State of Massachusetts.

JULIUS BUNIS.